(12) United States Patent
Strohecker et al.

(10) Patent No.: US 8,602,343 B2
(45) Date of Patent: Dec. 10, 2013

(54) FISHING REEL WITH FREE SPOOL CONTROLLER

(76) Inventors: James R. Strohecker, Fort Pierce, FL (US); David H. Wilkening, Fort Pierce, FL (US); Kenneth F. Avola, Jensen Beach, FL (US); Paul C. Jordan, Fort Pierce, FL (US); Andrew J. Ingle, Fort Pierce, FL (US); Jonathan S. Dohner, Blairsville, PA (US)

( * ) Notice: Subject to any disclaimer, the term of this patent is extended or adjusted under 35 U.S.C. 154(b) by 855 days.

(21) Appl. No.: 12/766,289

(22) Filed: Apr. 23, 2010

(65) Prior Publication Data

US 2011/0259988 A1 Oct. 27, 2011

Related U.S. Application Data

(60) Provisional application No. 61/214,448, filed on Apr. 23, 2009.

(51) Int. Cl.
*A01K 89/01* (2006.01)
(52) U.S. Cl.
USPC ............ 242/288; 242/223; 242/245; 242/309
(58) Field of Classification Search
USPC .......................... 242/223, 245, 285, 288, 309
See application file for complete search history.

(56) References Cited

U.S. PATENT DOCUMENTS

| 4,402,470 | A  | * | 9/1983  | Hamayasu ............... 242/286 |
| 5,007,601 | A  | * | 4/1991  | Emura et al. ............. 242/223 |
| 6,045,076 | A  | * | 4/2000  | Daniels .................. 242/287 |
| 6,412,722 | B1 | * | 7/2002  | Kreuser et al. ........... 242/288 |
| 6,973,999 | B2 | * | 12/2005 | Ikuta et al. .............. 188/161 |
| 7,159,813 | B2 | * | 1/2007  | Ikuta et al. .............. 242/289 |
| 7,188,793 | B2 | * | 3/2007  | Ikuta et al. .............. 242/223 |
| 2004/0227029 | A1 | * | 11/2004 | Ikuta et al. .............. 242/288 |

* cited by examiner

*Primary Examiner* — Emmanuel M Marcelo
(74) *Attorney, Agent, or Firm* — Ober, Kaler, Grimes & Shriver; Royal W. Craig (57) ABSTRACT

A drag/free spool controller incorporated into a fishing reel that has a signal generator mechanically attached to the reel. When the spool spins the signal generator produces a voltage signal, and after a pre-determined number of rotations, the generated signal is compared to a pre-determined value to determine if the spooling corresponds to a fish strike. When the generated voltage signal exceeds the pre-determined value, indicating a fish strike, a solenoid attached to the reel is actuated to disengage the drag mechanism, placing the reel into a free spool position. This action allows the fish to run with the bait while the angler repositions himself to manually engage the drag to set the hook. If after a pre-determined interval the angler fails to manually engage the drag, the solenoid will do so automatically.

29 Claims, 9 Drawing Sheets

FISHING REEL WITH FREE SPOOL CONTROLLER

CROSS-REFERENCE TO RELATED APPLICATION(S)

The present application derives priority from U.S. provisional application Ser. No. 61/214,448 filed Apr. 23, 2009.

BACKGROUND OF THE INVENTION

1. Field of the Invention

The invention generally relates to fishing products and, more specifically, to a free spool controller for a fishing reel.

2. Description of the Background

Sailfish and marlin are among the most prized sport fishing trophy fish in existence, largely because they fight aggressively, launching themselves out of the water over and over again. However, catching a sailfish and/or marlin is no simple task. It takes great finesse. Typically, a heavy duty lever-drag reel is spooled with over 400 yards of 20-30 pound test monofilament, and ballyhoo, pilchards, threadfin herring or goggle eyes are used as bait. The bait may be drifted, slow trolled or fished from a kite, and in all such cases the reel is generally kept in a normal drag position until a fish strikes. Both sailfish and marlin are notoriously sensitive when they first take the bait. Just the slightest tug on the line when the fish comes upon the bait can result in them mouthing it, and then dropping it. For this reason, most anglers immediately release the reel drag to free spool with the clickers on, or with the bail open. The fish will pull the line in free spool as it runs with the bait, and it will not be pulled out of its mouth. However, within 5-10 seconds of the strike, the drag lever must be returned to the strike position and the hook set, or chances are that the fish will escape. This precisely-choreographed sequence sounds easy, but is very difficult to implement in practice. Sailfish and marlin tend to strike when the anglers are sitting around relaxing, and many are lost because the anglers are slow to the rod. This problem is especially acute for elderly anglers who are not as spry and cannot always jump to the rod within seconds of a strike. It would be helpful to automate the process of switching modes from drag to free spool and back, within a set interval after the fish strikes. While there have been prior efforts to electrically-control a fishing reel, none are for the foregoing purpose.

U.S. Pat. No. 7,188,793 to Takeshi Ikuta issued Mar. 13, 2007, shows an electric circuit for controlling a fishing reel spool, primarily to prevent backlash. A rotor having four magnets is disposed on the spool's shaft, and surrounding the rotor are coils. This rotor assembly is used to both generate electricity and brake the spool.

U.S. Pat. No. 6,045,076 to John J. Daniels issued Apr. 4, 2000, shows an anti-backlashing fishing reel. A line sensor generates a signal based upon the tension in the line to control the electronically variable brake. Depending upon the signal, the variable brake will apply a force to the spool to resist rotation to prevent an overrun.

U.S. Pat. No. 5,831,417 to John Wun-Sing Chu issued Nov. 3, 1998, shows electronic circuitry that takes input data, such as the outside diameter of the spool, the tension in the line, and the length of the released line, to determine whether the drag should be increased or decreased. The drag mechanism is engaged through constricting forces created by SMA wire that is controlled by the electronic circuitry.

U.S. Pat. No. 4,940,194 to John N. Young issued Jul. 10, 1990, shows casting reel with a dynamically controlled variable casting drag. A magnetic disc is connected to the spool shaft, and when the disc rotates with the shaft, an electrical coil produces an output signal. An electric circuit receives the signal and produces a drag signal based on the output signal, and the drag signal is used to control an electronic brake.

U.S. Pat. No. 4,790,492 to Takashi Atobe issued Dec. 13, 1988, shows a reel having a revolution sensor device. The device includes magnets located on the spool and Hall effect sensors opposing the magnets. An on-board microcomputer uses the generated signal to calculate line length.

U.S. Pat. No. 5,219,131 to Furomoto issued Jun. 15, 1993 shows a fishing reel with electronic drag measurement for notifying the user of the exact braking force of a drag mechanism.

U.S. Pat. No. 6,412,722 to Christopher K. Kreuser et al. issued Jul. 2, 2002, shows a bait cast fishing reel having a sensor to generate signals representing rotation of the spool. The sensor is coupled to a controller. Using the spool rotation signals, the controller generates a control signal that is transmitted to the breaking mechanism. The breaking mechanism comprises an electric solenoid that engages a brake pad with the spool when casting to prevent backlash.

Figure 1:
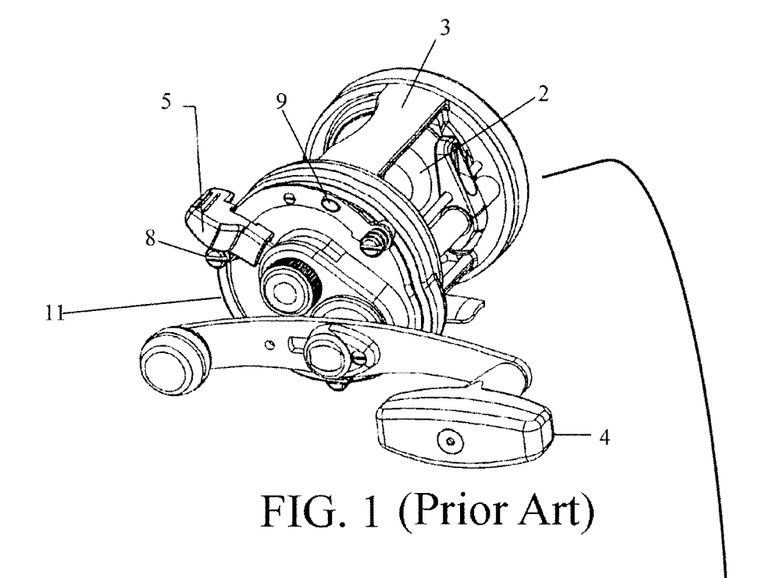
FIG. 1 illustrates a conventional lever drag fishing reel (prior art).

None of the foregoing references nor any other known prior art suggests an automatic electronic drag/free spool control system that is capable of incorporation into an otherwise conventional lever-drag reel to selectively release, and then reapply drag a predetermined interval after a fish strike. FIG. 1 is an illustration of a conventional "big water" lever drag reel, and FIG. 2 details the internal spool, spindle and brake washer of FIG. 1.

Figure 2:
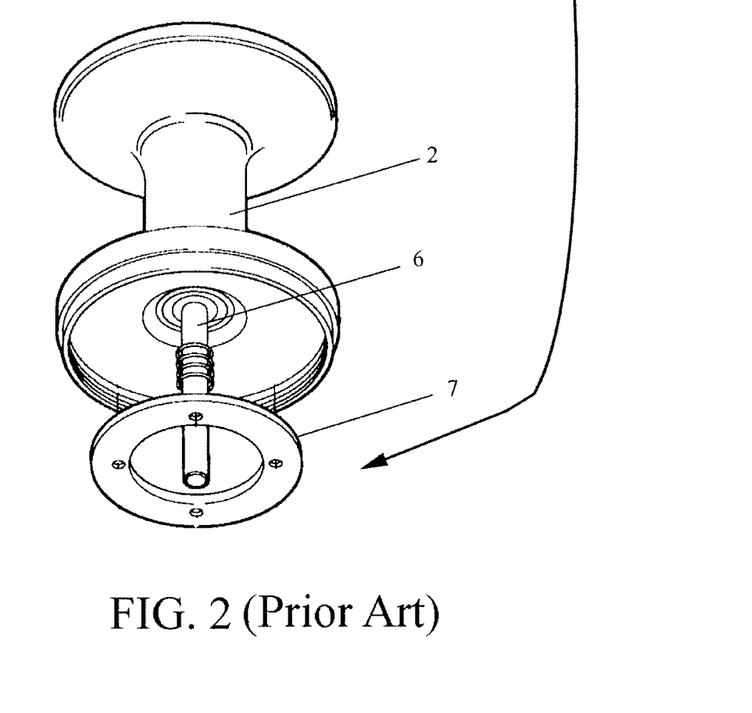
FIG. 2 details the spool, spindle and brake washer of FIG. 1 (prior art).

Such reels typically seat a rotatable spool 2 inside a unitary open frame 3. The spool 2 is rotatably carried on a spindle 6, and a hand crank 4 turns the spool 2 on the spindle 6 via an internal gear mechanism. A lever 5 allows preset of the desired drag from far left (0% drag) to far right (100% drag). As seen in FIG. 2, the lever 5 extends and/or retracts the internal spindle 6 which in turn moves a brake washer 7 located at the opposing side of the reel, the brake washer 7 acting as a disc brake against the side of spool 2. The brake washer 7 may be pre-biased toward the spool 2 by a spring or Belleview washer. When more drag is required, moving lever 5 clockwise retracts spindle 6, thereby compressing the Belleview washer and biasing brake washer 7 harder against the spool 2 and requiring more pull to release line. When less drag is required, moving lever 5 counterclockwise extends spindle 6, thereby easing off the brake washer 7 and requiring less pull to release line. The reel is set to free spool when the lever 5 is pulled all the way counterclockwise and all drag on the spool 2 is released. The reel is set to maximum drag when the lever 5 is moved fully clockwise from free spool position. Typically there is a spring-loaded (detent) button two thirds along the path of travel of the lever 5, known as a strike button 9. In addition, a stationary screw-post 8 acts as a stop demarcating the full free spool position. The reel is set to strike or "normal drag" when the lever 5 is moved clockwise from free spool position 8 and hits the strike button 9. This is where anglers fight fish, and is designed to demarcate a drag setting equal to 33% of the line rating. If desired, the strike stop button 9 can be depressed allowing the angler to move the lever 5 forward to maximum drag, although max drag is typically higher than the line rating and results in broken fishing line. This is the basic footprint of a conventional lever drag fishing reel as referred to herein, although some conventional reels have equivalent free spool buttons in place of lever 5. In practice, anglers will keep the lever 5 at the strike button 9 while trolling, kite fishing, or jigging. If a fish strikes, the angler must immediately place the lever 5 in free spool position 8 allowing the fish to run with the bait in free spool so as not to pull the bait out of its mouth. Then, within 5-10 seconds of the strike, the drag lever 5 must be returned to the strike position 9 and the hook set, or the fish will escape. This precisely-choreographed sequence is very difficult to implement in practice, especially if the anglers are seated at a distance and not as spry as they once were, or deep in conversation when the fish strikes.

SUMMARY OF THE INVENTION

It is, therefore, the primary object of the present invention to provide a free spool controller for a fishing reel that senses a fish strike, automatically places the reel in free spool mode, and then affords the angler a predetermined interval of free-spooling with a manual switch to free spool mode before automatically applying drag, thereby providing a safeguard if the anglers are not quick enough to jump up and manually set the drag.

It is another object to provide a free spool controller as above that can easily be incorporated into the footprint of a conventional lever drag fishing reel.

These and other objects are accomplished by an electronic drag/free spool controller incorporated into a fishing reel that has a transducer attached to the spool. When the spool spins the transducer generates a signal which is fed to a controller, and the controller determines if the spooling corresponds to a fish strike. When the transducer signal indicates a fish strike, an actuator automatically disengages the drag mechanism, placing the reel into a free spool position. This action allows the fish to run with the bait while the angler repositions himself to manually engage the drag to set the hook. If after a pre-determined interval the angler fails to manually engage the drag, the actuator will do so automatically.

BRIEF DESCRIPTION OF THE DRAWING

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a fishing reel incorporating an automatic free spool control system. The free spool control system has at least two separate controls, one being ON or OFF, and one being AUTOMATIC or MANUAL Modes. When turned OFF, the reel functions as an ordinary reel. Thus, after a strike, the user will need to manually put the reel into free spool by moving the drag lever (ref 5 in FIG. 1) to free spool position 8, or in case of some other control (e,g, a free spool button) by pushing down on that button or otherwise operating the free spool control. The reel will remain in free spool as long as the momentary free spool button or lever 5 is held in the free spool position. When the user releases the momentary free spool button or moves the drag lever towards drag, the reel returns to normal drag operation. Thus, when in OFF Mode the fishing reel of the present invention functions as a conventional big water lever drag fishing reel.

When the ON/OFF control is turned ON, the AUTOMATIC or MANUAL Modes offer two choices. When in ON/AUTOMATIC mode, the reel senses revolution of the spool when a fish strikes. It waits (in normal drag, typically at the strike stop button 9 of FIG. 1) until the reel has turned a programmable distance, and then the reel automatically enters free spool. The reel remains in free spool a programmable number of revolutions and, assuming the angler does not enter ON/MANUAL Mode, ON/AUTOMATIC mode automatically returns the reel to normal drag. This automates the entire process of switching modes from drag to free spool and back when a fish strikes.

This ON/AUTOMATIC Mode is interruptible by the ON/MANUAL Mode, which is essentially a manual override that momentarily prevents return of the reel to normal drag. Though various physical control schemes are envisioned for switching between these modes (as described below), three electronic switches accessible on the reel will suffice: a two position ON/OFF switch, a two-position AUTOMATIC Mode switch, and a momentary MANUAL Mode switch. This way, anytime the angler picks up the rod during the programmed free spooling time period in ON/AUTOMATIC Mode and depresses the momentary ON/MANUAL mode button, the reel enters ON/MANUAL Mode, which interrupts the ON/AUTOMATIC MODE countdown and maintains free spool for a longer duration of time. If the angler picks up the rod after the ON/AUTOMATIC Mode countdown when the reel has been returned to normal drag, and depresses the momentary ON/MANUAL mode button, the reel immediately enters free spool for as long the ON/MANUAL Mode button is depressed, thereafter returning to ON/AUTOMATIC Mode when the angler releases the ON/MANUAL Mode switch. In addition to the electronic modes the angler can manually go in and out of free spool anytime simply by depressing or releasing the existing reel free spool button/lever supplied with the reel.

Effectively, the combination of ON/AUTOMATIC MODE and ON/MANUAL modes afford a predetermined interval of free-spooling time for the angler to reach the reel and manually switch to drag mode, before the reel itself automatically switches to drag mode. This provides a safeguard in case no angler is quick enough to jump up and manually set the drag.

Figures 3, 4:
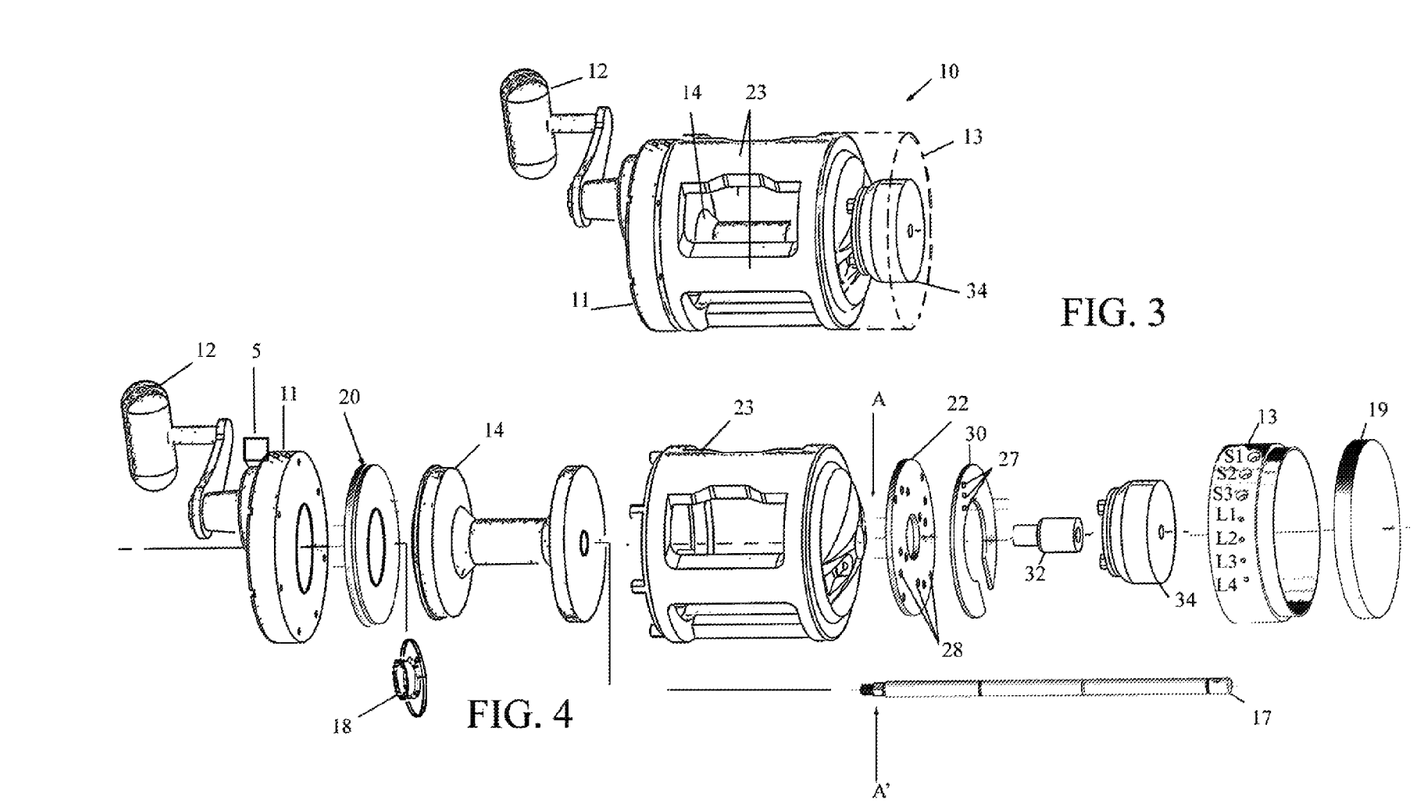
FIG. 3 illustrates the entire reel assembly 1 in assembled form.
FIG. 4 is an exploded perspective view illustrating all the components of the fishing reel 1 with enlarged insets of individual components.

FIG. 3 illustrates the entire reel assembly 10 in assembled form, and FIG. 4 is an exploded perspective view illustrating all the components of the fishing reel 10 with enlarged insets of individual components. As seen in FIG. 3, the reel assembly comprises certain components in common with typical big water lever drag spinning reels, and like components seen in FIGS. 1-2 are similarly numbered. These components include a unitary open frame 3, a rotatable spool 2 inside the frame 3, hand crank 4 and opposing side plate 11 with internal gear mechanism for turning the spool 2 about a spindle 17. The spindle 17 is inserted through the center of the spool 2 and serves as a stationery axle. A gear wheel 18 is inserted onto the end of spindle 17, and the gear wheel 18 is keyed to the spool 2. The gear wheel 18 is a conventional component that engages an internal spring (not shown) simply to create a clicking noise and a minute but efficient amount of drag for indexing the position of the spool 2. Turning the crank 4 one way rotates the spool 2 in a conventional manner similar to other existing fishing reels. Turning the crank 4 in the opposite direction is inoperative on the internal gear mechanism and has no effect. A brake washer 7 is mounted adjacent the spool 2 on spindle 17. The brake washer 7 rotates with spool 2, and applies a braking (drag) force to it as per the drag lever 5 described with reference to FIG. 1. When the user wants more drag, they move drag lever 5 clockwise which biases spindle 17, thereby forcing brake washer 7 harder against the spool 2 and increasing the braking drag. When the user wants less drag, they ease off drag lever 5 which biases spindle 17 thereby removing pressure. One skilled in the art will understand that additional components and slightly different components may be incorporated in side plate 11. For example, many reels have clicking mechanisms to index rotation, etc. The present invention would not affect their operation. Indeed, one skilled in the art will recognize that everything to the left of line A-A' may be considered conventional components found on conventional reels.

In accordance with the present invention, the reel assembly 10 also comprises a position disc 22 mounted on the spindle 17 and adapted to rotate with the spool 2 (enclosed between frame 3 and spool 2), and a drag/free spool controller circuit board 30 adjacent the position disc 22 but fixedly mounted within frame 3 and stationary relative to position disc 22. The spindle 17 protrudes through spool controller circuit board 30 and terminates at the far end of a solenoid 34. A metal hub 32 is slidably inserted between spool 2 and solenoid 34. Solenoid 34 is commercially-available plunger solenoid with the metal hub 32 forming the longitudinally movable plunger and a toroidal coil body operable to move the plunger. The metal hub 32 may be spring-biased as is known with plunger solenoids, to bias the hub 32 back into the solenoid 34. With this configuration, electrical activation of solenoid 34 pushes hub 32 and spindle 17 outward slightly (0.060", though this distance may vary with different reels). This pushes the brake washer 7, which is likewise attached to the spindle 17 on the other side of the spool 2, out of its normal preset drag engagement with the spool 2 into free spool. The current system operates from a 12VDC power supply derived from the boats power main, though it is envisioned that a 12 VDC battery could be used for portability. The solenoid 34 is one exemplary mechanism for controlled shifting of spindle 17 along its axis in order to disengage the brake washer 7, but other suitable linear positioning actuators exist. Alternative motorized embodiments are described below.

Given the linear actuator and mechanism for axially shifting spindle 17, the present system adds the capability of knowing when to shift in and out of free spool. This is accomplished with the position disc 22 and the way that it interfaces the drag/free spool controller circuit board 30. Position disc 20 forms a Hall-effect sensor with controller circuit board 30. Specifically, position disc 22 is a flat circular washer having a particular pattern of very small permanent magnets 28 embedded therein. The position disc 22 faces the controller circuit board 30 which, in addition to power regulation and control circuitry (to be described), also provides a plurality of Hall sensors 27 on its backside in facing relationship with position disc 22. The Hall sensors 27 are aligned with the rotation paths of the magnets 28 embedded in position disc 22, and can thereby sense when a corresponding magnet 28 passes there beneath. Using a pattern of magnets 28 and Hall sensors 27, the relative angular position of position disc 22 and hence the spool 2 can be accurately determined, and the rotation of the spool 2 can be tracked by controller circuit board 30. Thus, the spool controller circuit board 30 is essentially an electronically-actuated automatic free spool controller that reads the position disc 22 and switches modes from normal drag to free spool and back dependent on its angular position and/or rotation. More specifically, the spool controller circuit board 30 senses the angular position and rotation of position disc 22 (and hence spool 2) and selectively activates solenoid 34 to disengage the brake washer 7. The spool controller circuit board 30 includes control circuitry to do this in a predetermined sequence dependent on the selected one of three above-described modes. When OFF, no electronic control is exerted. When in ON/AUTOMATIC MODE, the spool controller circuit board 30 initially leaves the brake washer 7 in normal engagement as set manually using the drag lever 5 (see FIG. 1). However, when a fish strikes and peels away line, the spool 2 begins to rotate as does position disc 22, and spool controller circuit board 30 counts a programmable first number of tics of revolution (for example, three full revolutions) and then automatically activates solenoid 34 to disengage the brake washer 7, thereby entering free spool. The fish, which typically only mouths the bait and swims away, peels away line without drag (which would otherwise cause the fish to disgorge the bait). The spool controller circuit board 30 continues to monitor, counting a programmable second number of tics of revolution in free spool mode (for example, fifty full revolutions), and then automatically deactivates solenoid 34 to engage the brake washer 7, thereby returning to normal drag. This automates the process of switching from drag to free spool and back, within set intervals after a fish strikes. The user always has the option of interrupting ON/AUTOMATIC MODE if they can reach the reel in time to extend the free spool duration before the reel itself automatically switches to normal drag, or if too late to switch back to free spool. This is done simply by depressing an ON/MANUAL mode switch, which interrupts the ON/AUTOMATIC MODE counting and, if necessary, immediately activates solenoid 34 to disengage the brake washer 7, thereby returning to free spool for a longer duration. Again the ON/MANUAL mode control is preferably a momentary switch and when released the reel returns to ON/AUTOMATIC MODE counting. Consequently, the ON/AUTOMATIC MODE affords a predetermined interval of free-spooling time for the anglers and provides a safeguard in case no angler is quick enough to jump up and manually set the drag.

The system components which are not existing parts of the conventional lever drag reel are the position disc 22, spool control circuit board 30, hub 32, solenoid 34, master sleeve 13 and end cap 19. In addition, the spindle 17 is elongated slightly to extend hub 32 into solenoid 34, but is otherwise a conventional fishing reel spindle with rounded cross-section that serves as an axle for spool 2.

The master sleeve 13 is custom manufactured to replace the existing reel side plate which is screwed onto frame 3. The master sleeve 13 is a hollow cylindrical cover slightly longer than the existing manufacturer-supplied side plate in order to accommodate the position disc 22, spool control circuit board 30 and solenoid 34. The master sleeve 13 accepts a screw-on cap 19 to completely enclose the components. Note also the master sleeve 13 is machined with a plurality of side apertures for access to the mode control switches and viewing of mode-indicator LEDs (indicating the current operating mode) all resident on the spool control circuit board 30. As described below, the number and function of the physical switches and LEDs may vary as a matter of design choice, and three switches S1-S3 are shown in FIG. 4 along with three LEDs L1-L3 according to one exemplary control scheme suitable for implementation of the embodiment of FIGS. 3-4.

Figure 5:
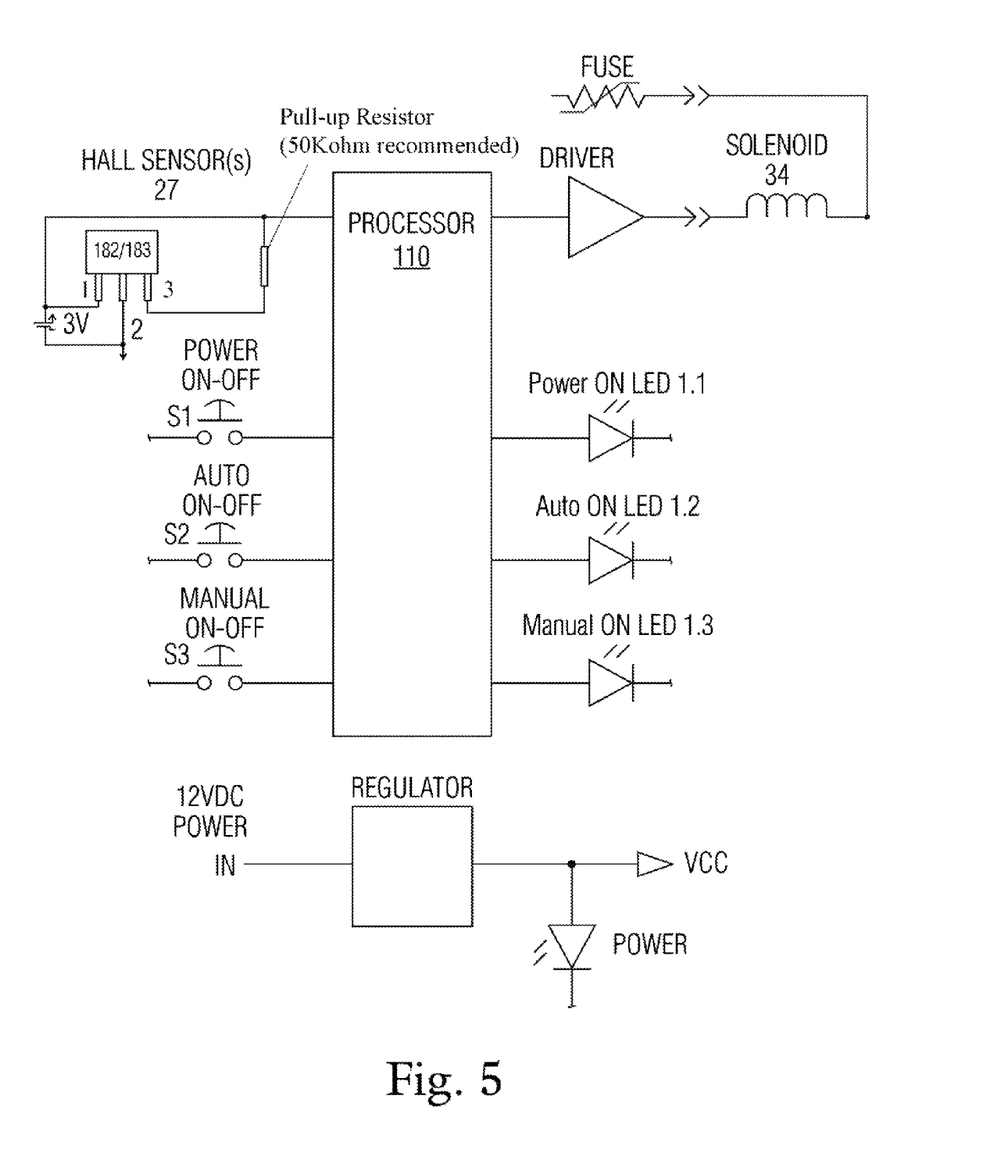
FIG. 5 is a block diagram of an exemplary control circuit for spool control circuit board 30.

FIG. 5 is a block diagram of an exemplary control circuit for spool control circuit board 30. The circuit board 30 includes at least one Hall Effect sensor 27 with outputs connected to a processor 110. The Hall Effect sensor 27 in the illustrated embodiment may be an AH182 Low power Hall Effect Switch manufactured by Diodes Incorporated. If desired, two or more such Hall Effect sensors 27 may be used, and indeed in the presently preferred embodiment three Hall Effect sensors 27 are used to provide three separate pickups because this is necessary to determine spooling direction. The AH182 is a three-terminal Hall effect sensor device with a output driver, mainly designed for battery-operation. Power is supplied from a remote 12 VDC power source connected by a DC input connector to the circuit board 30, and through an on/off power switch S1. An on-board voltage regulator supplies 3 VDC regulated power to the Hall Effect sensor(s) 27 and processor 110. One skilled in the art will understand that voltage requirements may be adjusted as a matter of design choice. A surface mount power ON LED L1 is also provided on circuit board 30, and a connector for external power is provided. A PC-board mounted AUTO Mode ON switch S2 is provided to set the controller to ON/AUTOMATIC mode, and a surface mount AUTO ON LED L2 is also provided on circuit board 30 for indicating same. In addition, a PC-mounted MANUAL Mode ON switch S3 is provided to set the controller back to ON/MANUAL mode, and a surface mount MANUAL ON LED L3 is also provided on circuit board 30 for indicating same. The processor 110 performs, for example, counting and calculation, on the incoming Hall Effect tics. The basic elements that can be determined by the processor 110 are shaft speed, amount of rotation, direction of rotation, and time between events. All elements, except for direction, can be determined by using only one Hall sensor, whereas the latter requires two or three. Thus, in its simplest form the processor 110 counts a number of tics as the spool turns after a fish strike, and determines the number of tics needed to enter "free spool" mode and then back to normal drag. In this regard, the processor 110 may be any general-purpose or special purpose computer, such as, for example, a processor, a digital signal processor, a microcomputer, a field programmable array, a programmable logic unit (PLU), a microprocessor or any other device capable of performing the foregoing counting and responding to and executing mode instructions pursuant to the present method. The processor 110 may run software for implementing the method and functions described above. The processor 110 also may access, store, manipulate, process, and create data in response to these applications. The software applications may include a computer program, a piece of code, an instruction, or some combination thereof, for instructing the processor 110 to operate as desired. In addition, a more rudimentary digital counter and gate array may be used (functionally equivalent to a PLU). If desired, PC-board-mounted DIP switches may be provided on circuit board 5 and connected to processor 110 to allow factory or user-selection of the number of tics (or time interval) needed for drag-to-free spool and for free-spool to drag. This way, by setting a DIP switch the angler has a choice of however many revolutions are desired to allow line to spool out in drag mode before putting the reel in free spool, and then back again. The processor 110 also counts tics or times an interval before putting the reel back into drag mode. The PC-mounted DIP switches are preferably sealed inside the master sleeve, accessible by rubberized covers or by the angler taking off the master sleeve 13.

Figure 6:
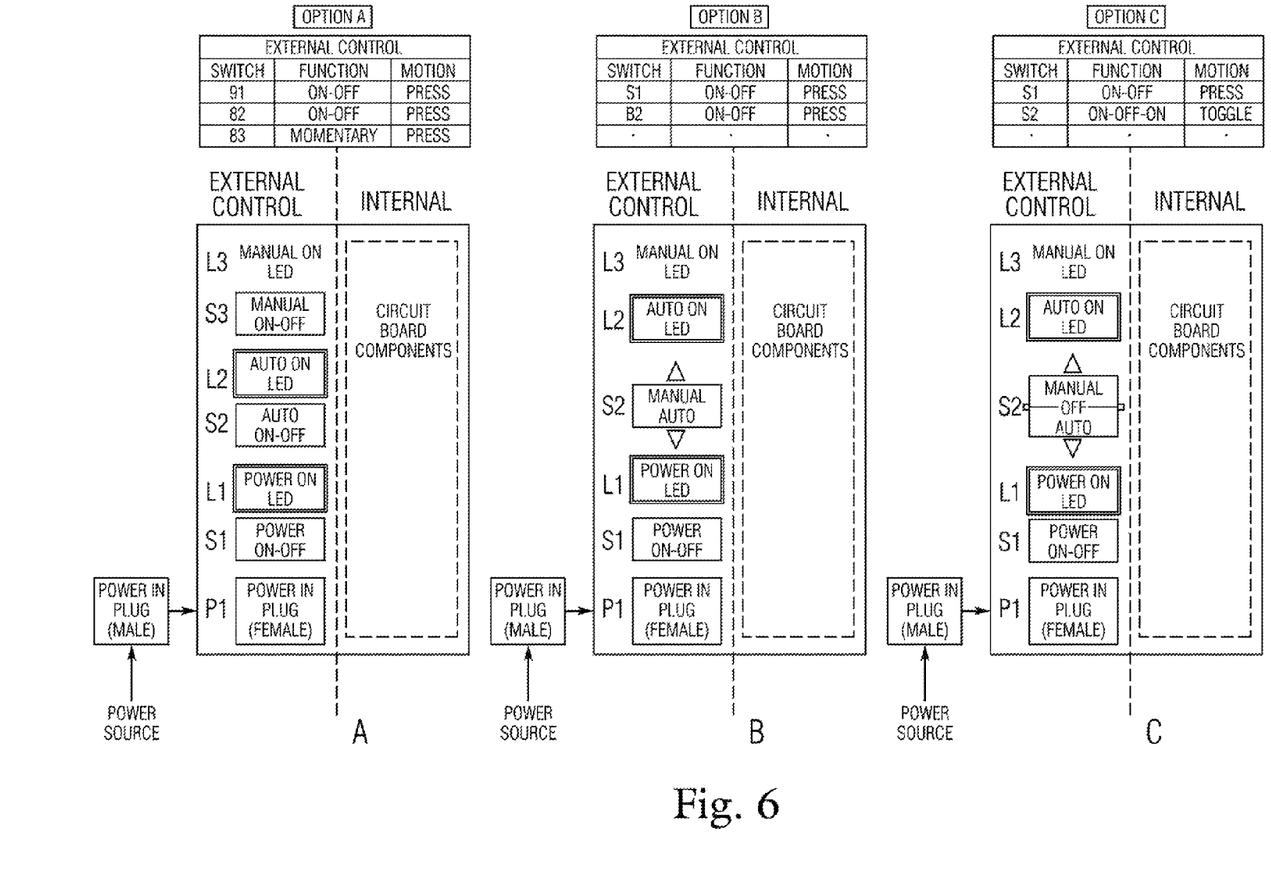
FIG. 6 is a diagram of the control scheme and switches S1, S2, S3 and LEDs L1-L3 mounted external to the reel 1 in master sleeve 13 for implementing the control scheme.

FIG. 6 is a diagram illustrating three exemplary control schemes using various switches S1, S2, S3 mounted on the circuit board 30 for implementing the control scheme.

In FIG. 6A, when the ON/OFF control S1 is turned OFF, no power is applied, the ON/OFF LED L1 remains off, and the reel is usable as normal with a manual lever drag and manual free-spool button. When the ON/OFF control S1 is turned ON, power is applied, the ON/OFF LED L1 illuminates, and the AUTOMATIC or MANUAL Mode switches S2, S3 offer two choices of ON/AUTOMATIC MODE or ON/MANUAL MODE override. By depressing the AUTOMATIC mode ON switch S2, the AUTO ON LED L2 illuminates, the processor 110 assumes control and senses revolution of the spool when a fish strikes. It waits (in normal drag) until the reel has turned a programmable first distance, and then the reel automatically enters free spool. The reel remains in free spool a programmable number of revolutions and then returns to normal drag. This automates the entire process of switching modes from drag to free spool and back when a fish strikes. However, this AUTO ON Mode is interruptible by depressing the MANUAL ON control S3, which is essentially a manual override to ON/MANUAL MODE as described above. The MANUAL ON LED L3 illuminates, and the processor 110 relinquishes control to the angler. The MANUAL ON control S3 is preferably a momentary switch that allows the angler to pick up the rod during the programmed AUTOMATIC free spooling time period, depress the momentary MANUAL ON button S3, and the reel enters ON/MANUAL Mode and free spools, returning to ON/AUTOMATIC Mode when the angler releases the MANUAL ON button S3. The angler can manually go in and out of free spool anytime simply by depressing or releasing the MANUAL ON button S3. This interrupts the ON/AUTOMATIC MODE countdown to maintains free spool for a longer duration of time, or if ON/AUTOMATIC Mode has already switch to normal the momentary MANUAL ON button S3 will immediately force the reel to free spool for as long the button is depressed, thereafter returning to ON/AUTOMATIC Mode.

Effectively, the combination of AUTO ON S2 and MANUAL ON S3 modes afford a predetermined interval of free-spooling time for the angler to reach the reel and manually switch to drag mode, before the processor 110 automatically switches to drag mode. This provides a safeguard in case no angler is quick enough to jump up and manually set the drag.

In FIG. 6B, the control scheme is similar to 6A but the AUTOMATIC ON and MANUAL ON switches S2, S3 are consolidated in a single rocker switch S2 which flips back and forth between AUTO ON Mode and MANUAL ON Mode. Operation is the same, and the angler can manually go in and out of free spool anytime simply by switching the button S2 from MANUAL ON to AUTO ON.

In FIG. 6C, the control scheme is similar to 6B but the AUTOMATIC ON and MANUAL ON switches S2, S3 are consolidated in a single toggle switch S2 which toggles back and forth between AUTO ON Mode/OFF Mode/MANUAL ON Modes. Operation is the same, and the angler can manually go in and out of free spool anytime simply by toggling the button S2 from MANUAL ON to AUTO ON.

Figure 7:
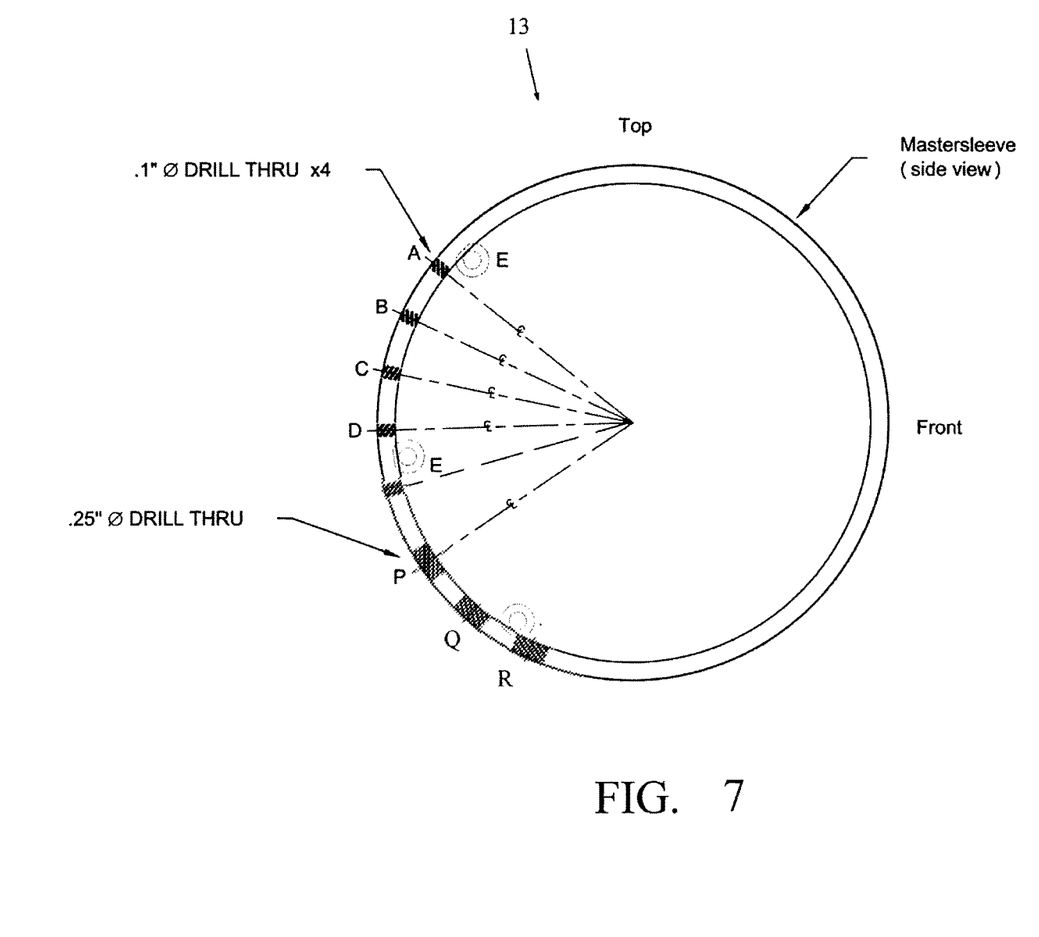
FIG. 7 is a side view of the master sleeve 13A.

FIG. 7 is a side view of the master sleeve 13 illustrating placement of a plurality of through-bores for displaying LED indicators L1-L3 mounted on the circuit board 5 described above, and for accessing the PC-mounted switches S1-S3. Three LEDs L1-L3 are mounted behind clear acrylic waterproofed inserts at A, B and C, and these include the Power On LED (L1), the Manual Mode ON LED indicator (L3), and the Auto Mode ON Indicator (L3) as shown in FIG. 6A. In addition, the Manual/Auto PC-mounted switches S2, S3 and ON/OFF switch S1 are mounted at P, Q and R behind rubberized waterproof covers. Another bore-hole at E is preferably provided with a surface-mount environmentally-sealed female receptacle for connection to an external power 12 VDC power source.

Figure 8:
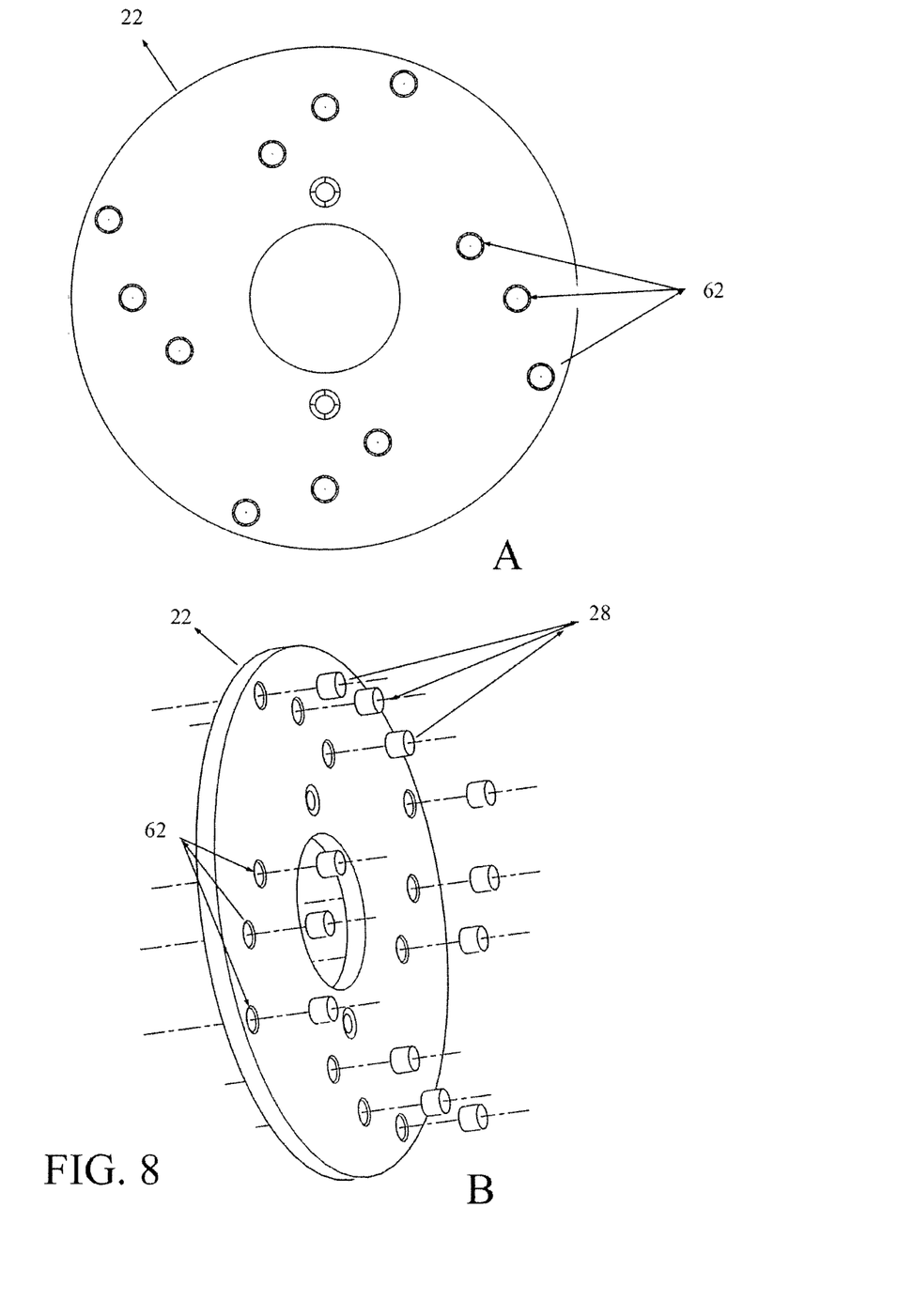
FIG. 8 is a composite drawing illustrating various views of the non-ferrous magnet disk 22 with a plurality of magnets 28 mounted in the non-ferrous disk 22.

FIG. 8 is a composite drawing illustrating a front view (A) and side perspective view (B) of the non-ferrous position disk 22 with a plurality of magnets 28 mounted in the non-ferrous disk 22. The disk 22 is a flat washer-like member with a central aperture and machined with a number of boreholes 62 patterned uniformly-spaced around the periphery. Each borehole 62 seats a magnet 28 in a facing relationship with circuit board 30. As shown, the magnets 28 may be 0.125" annular disks press-fit or glued into the corresponding boreholes 62. In the illustrated embodiment, four sets of three magnets 28 are employed, the magnets 28 of each set being offset and positioned at different radii to form spiracle radii. Thus, for a reel requiring eighteen "clicks" to accomplish a complete revolution, the disk 8 is partitioned into eighteen 20 degree sectors, and the magnets 28 are spaced by 20 degrees with each set separated by a dead space. This way, each click of the reel corresponds to a Hall Effect tic. Of course, different reel models employ different click-measures of rotation and it is envisioned that the specific number and spacing of magnets will be driven by the particular reel for which it is designed. However, this multiple angularly-spaced magnet design offers a flexible programming capabilities to suit most commercial reels.

One skilled in the art will readily understand that any mechanical, optical or magnetic index-counting device may be used in place of Hall Effect sensor(s) 27 and position disk 22 for rotation/angular measurement of the spool 2.

One skilled in the art should also understand that solenoid 34 is but one mechanism for controlled shifting of spindle 17 along its axis in order to disengage the brake washer 7. Other suitable linear positioning mechanisms exist. For example, two motorized embodiments are described below.

Figure 9:
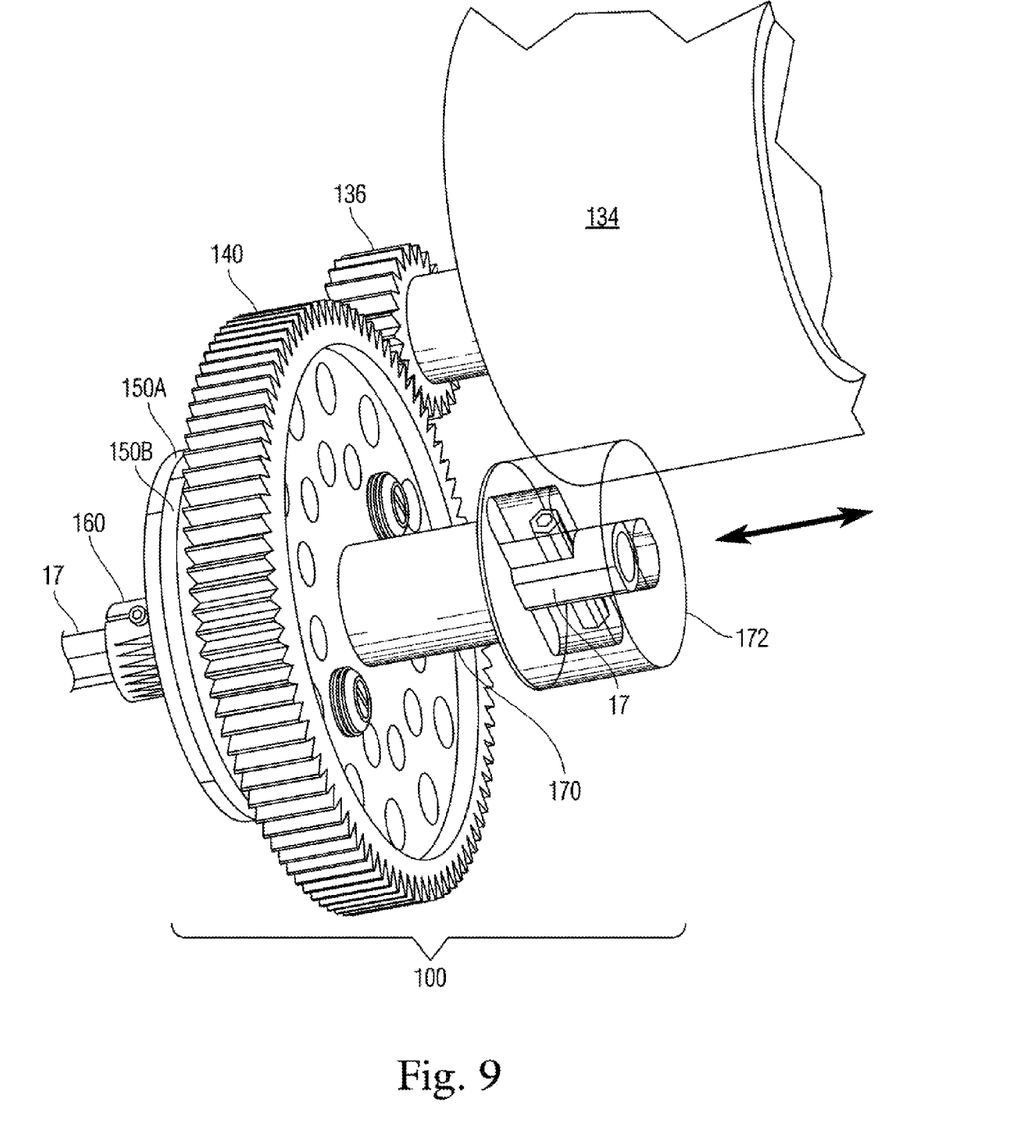
FIG. 9 is a close up view of an alternative motor-based braking mechanism.

FIG. 9 illustrates an alternate embodiment in which the solenoid 34 of FIGS. 3-4 is replaced by a small electric motor 134 and a translation gear assembly. The motor 134 is a standard 12 VDC electric motor such as, for example, Thomson P/N 21507A. In this instance the motor 134 shaft is equipped with a gear 136. The distal end of the spindle 17 is equipped with a gear-driven linear actuator 100 for converting rotary motion of the motor 134 into the necessary 0.060" displacement of spindle 17. Rotation of the gear 136 turns a larger reduction gear 140 mounted on a hub 170. The spindle 17 is slidably and rotatably carried in hub 170, hub 170 including an end collar 172 mounted stationary within master sleeve 13 that provides a limited degree of axial movement for spindle 17 as shown. The actual linear displacement of spindle 17 is accomplished with a set of ramped camming discs 150. One camming disc 150B is affixed to the reduction gear 140, and the other camming disc 150A is affixed by a collar 160 to spindle 17. Camming disc 150B bears against camming disc 150A via opposed inclined bearing surfaces, and as camming disc 150B rotates relative to camming disc 150A the opposed inclined bearing surfaces force the camming discs 150A, 150B apart. Counter-rotation allows them back together. This linear motion is transferred directly to the spindle 17, and is used for selectively engaging or disengaging free spool in the manner described above relative to FIGS. 2-3. The position disc 22 is identical to that described previously, and the spool control circuit board 30 is identical to FIG. 5 except that a motor driver is used rather than a solenoid driver.

Rather than camming discs 150A, 150B it is also possible to use a linear worm gear as the linear actuator for converting rotary motion of the motor 134 into the necessary 0.060" displacement of spindle 17.

Figure 10:
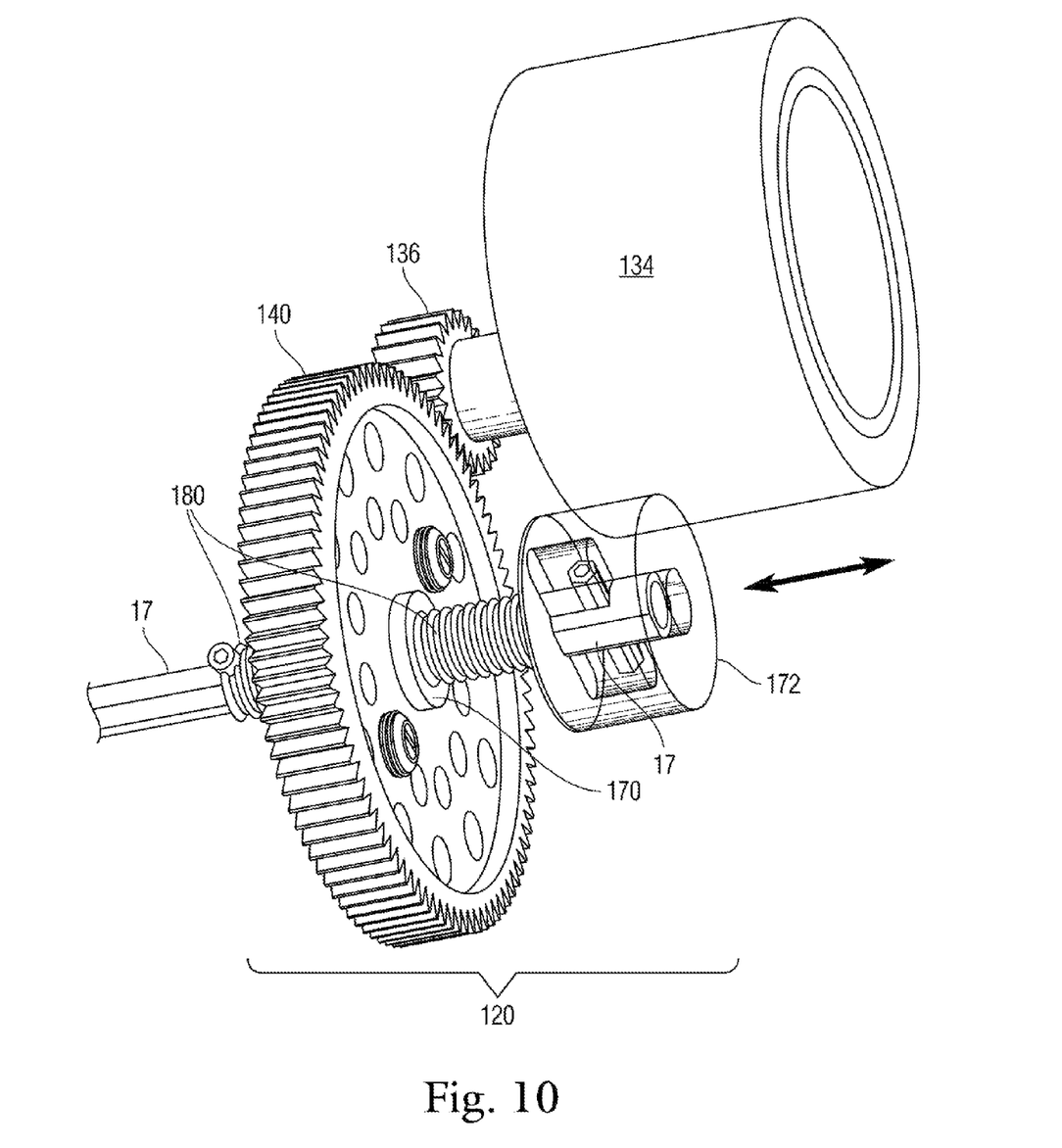
FIG. 10 is a close up view of yet another alternative motor-based braking mechanism.

FIG. 10 illustrates an exemplary worm gear linear actuator 120. The components are largely the same as described relative to FIG. 9 but the camming discs 150A, 150B are replaced by a spindle 17 shaft threaded with worm gear threads 180 and journaled through a threaded hub 170. This way, when reduction gear 140 turns, the hub 170 engages the threads 180 of spindle 17 and moving it linearly. This linear motion is used for selectively engaging or disengaging free spool in the manner described above relative to FIGS. 2-3. The position disc 22 is identical to that described previously, and the spool control circuit board 30 is identical to FIG. 5 except that a motor driver is used.

One skilled in the art will readily understand that a more expensive but conventional servo or step motor may be used in place of motor 134, in which case the driver of FIG. 5 must be a digital driver. It is also common for these types of actuators to include an integral encoder for position feedback, and this may be interfaced directly to the spool control circuit board eliminating the need for position disc 22.

Figure 11:
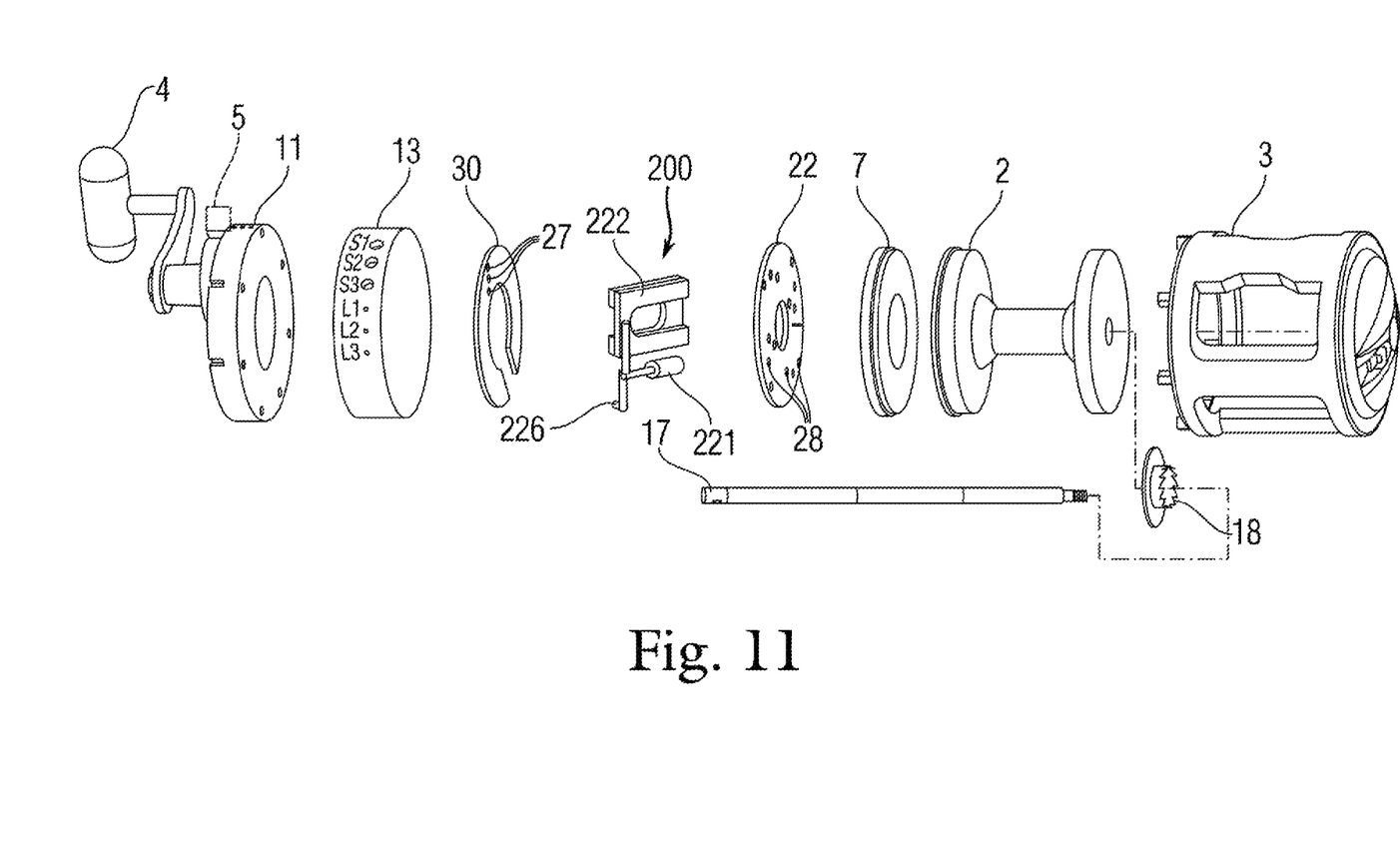
FIG. 11 illustrates yet another embodiment in which an electronic brake 200 operates directly on spool 2.

For certain reels that do not include a supplied brake disc 7 as shown in FIGS. 1-4, or whenever desired, any of the above-described embodiments may be adapted to apply a braking force directly to the rotating spindle 17 rather than by imparting a linear shift to spindle 17 to use the supplied brake disc 7. For example, FIG. 11 illustrates yet another embodiment in which an electronic brake 200 operates directly to apply a braking force to spindle 17. The spindle 17 is extended from spool 2 through the electronic brake mechanism 200, which is mounted to the spool control circuit board 30 in this case on the lefthand side of the reel. In the illustrated embodiment, the electronic brake 200 includes a linear solenoid 221 coupled to a mechanical wedge assembly 222 both affixed to the reel body 23. The spindle 17 passes through the wedge assembly 222 and is gripped thereby. The solenoid 221 operates the wedge assembly 222 in a guillotine-like manner. When in normal drag mode, the electronic brake 200 closes the wedge assembly 222 on the bushing 230 and imposes a direct drag on the spool 2 to prevent free spooling. The solenoid 221 here is a conventional linear solenoid with plunger shaft. The wedge assembly 222 comprises two opposing yokes slidably journaled together. Electrical activation and extension of the solenoid 221 bears outward upon a lever which draws open the opposed yokes, freeing the spool 2. Conversely, contraction of the solenoid 221 closes the opposed yokes, which in turn imparts a drag against the spool 2. When power is removed from the solenoid 221 the wedge assembly 222 returns and drag is placed back on the spool 2. This requires a return mechanism and for this return mechanism the wedge assembly 22 may be spring loaded. One skilled in the art should recognize that any suitable electro-mechanical braking mechanism will suffice for electronic brake 200, so long as it is capable of putting the reel in and out of free spool. Thus, the illustrated solenoid with slidable/expanding wedge design is just one possible embodiment, and one skilled in the art should understand that a variety of known mechanical expansion configurations exist and may be suitable.

It should now be apparent that the above-described drag/free spool controller 2 senses a fish strike, automatically places the reel in free spool mode, and then affords the angler a predetermined interval of free-spooling to manually switch to drag mode before automatically applying drag, thereby providing a safeguard if the anglers are not quick enough to jump up and manually set the drag. The free spool controller can easily be incorporated into the footprint of a conventional fishing reel.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. For example, rather than a Hall-effect sensor, the drag may be released and reset by sensing torque on the reel, though this is a more complicated and expensive endeavor.

It is to be understood, therefore, that the invention may be practiced otherwise than as specifically set forth in the appended claims.

We claim:

1. In a fishing reel having a spool rotatably mounted on a spindle and seated inside a frame, a hand crank for turning the spool on the spindle, and a drag control having a free spool setting and a drag setting, a free spool control system, comprising:
   a position indicator rotatable with said spool;
   a rotation sensor for detecting rotation of said position indicator;
   an actuator for switching said drag control from said drag setting to said free spool setting and back;
   an electronic spool controller in communication with said rotation sensor and said actuator for causing said actuator to selectively switch said drag control from said drag setting to said free spool setting after a predetermined first amount of rotation, and for causing said actuator to selectively switch said drag control from said free spool setting to said drag setting after a predetermined second amount of rotation.

2. A free spool control system according to claim 1 wherein said position indicator comprises a disk.

3. A free spool control system according to claim 2 wherein said disk has a plurality of permanent magnets affixed thereto.

4. A free spool control system according to claim 3 wherein said rotation sensor comprises at least one Hall Effect sensor for detecting rotation of said permanent magnets affixed to said disk and for generating index signals responsive thereto.

5. A free spool control system according to claim 4 wherein said rotation sensor comprises a plurality of Hall Effect sensors for detecting rotation of said permanent magnets affixed to said disk and for generating index signals responsive thereto.

6. A free spool control system according to claim 1 wherein said actuator comprises a solenoid.

7. A free spool control system according to claim 6 wherein said drag control comprises a disk brake mounted on said spindle and operative on said spool, and said solenoid moves said disk into and out of engagement with said spool.

8. A free spool control system according to claim 7 wherein said solenoid comprises a toroidal solenoid encircling said spindle, and said solenoid moves said disk into and out of engagement with said spool by axially shifting said spindle.

9. A free spool control system according to claim 1 wherein said actuator comprises a motor.

10. A free spool control system according to claim 9 wherein said drag control comprises a disk brake mounted on said spindle and operative on said spool, and said motor moves said disk into and out of engagement with said spool.

11. A free spool control system according to claim 10 wherein said motor is engaged to said spindle by a pair of offset bearing plates for moving said disk into and out of engagement with said spool by axially shifting said spindle.

12. A free spool control system according to claim 1 wherein said electronic spool controller is selectively operative in any one of a plurality of modes including OFF in which said reel functions manually, and AUTOMATIC in which said actuator selectively switches said drag control from said drag setting to said free spool setting after said predetermined first amount of rotation and selectively switches said drag control from said free spool setting to said drag setting after said predetermined second amount of rotation.

13. A free spool control system according to claim 12 wherein said electronic spool controller is additionally selectively operative in MANUAL mode which switches said drag control from said drag setting to said free spool setting regardless of rotation.

14. A free spool control system according to claim 13 further comprises a plurality of switches mounted on said reel for allowing user-selection of ON/OFF, AUTOMATIC and MANUAL modes.

15. A free spool control system according to claim 14 wherein said plurality of switches comprise s a momentary detent switch mounted on said reel for allowing momentary user-selection of MANUAL mode.

16. A free spool control system according to claim 15 further comprises a plurality of LED indicators switches mounted on said reel for providing a visual indication of ON/OFF and the user-selected AUTOMATIC and MANUAL modes.

17. A fishing reel, comprising: A spindle; a spool rotatably mounted on said spindle for spooling fishing line; a frame surrounding said spool; a hand crank for turning the spool on the spindle; a drag control having a free spool setting and a drag setting; and an electronic free spool control system including, a rotation sensor for detecting rotation of said spool, an actuator for switching said drag control between said drag setting and said free spool setting, an electronic spool controller connected to said rotation sensor and said actuator for causing said actuator to selectively switch said drag control from said drag setting to said free spool setting after a predetermined first amount of rotation, and for causing said actuator to selectively switch said drag control from said free spool setting to said drag setting after a predetermined second amount of rotation.

18. The fishing reel according to claim 17, further comprising a position indicator disk rotatable with said spool.

19. The fishing reel according to claim 18, wherein said position indicator disk comprises a plurality of permanent magnets, and said rotation sensor comprises at least one Hall Effect sensor for detecting rotation of said permanent magnets.

20. The fishing reel according to claim 18, wherein said drag control comprises a disk brake mounted on said spindle and operative against said spool, and said solenoid moves said disk into and out of engagement with said spool by axially shifting said spindle.

21. The fishing reel according to claim 17, wherein said actuator comprises a solenoid.

22. The fishing reel according to claim 17, wherein said actuator comprises a motor.

23. The fishing reel according to claim 17, wherein said electronic spool controller is selectively operative an any one of a plurality of modes including OFF in which said reel functions manually, and AUTOMATIC in which said actuator selectively switches said drag control from said drag setting to said free spool setting after said predetermined first amount of rotation and selectively switches said drag control from said free spool setting to said drag setting after said predetermined second amount of rotation.

24. The fishing reel according to claim 23, wherein said electronic spool controller is additionally selectively operative in MANUAL mode which switches said drag control from said drag setting to said free spool setting regardless of rotation.

25. The fishing reel according to claim 17, wherein said spool controller is mounted on a circuit board enclosed within said fishing reel.

26. The fishing reel according to claim 25, further comprising a plurality of switches mounted on said circuit board for allowing user-selection of ON/OFF, AUTOMATIC and MANUAL modes.

27. The fishing reel according to claim 26, wherein said plurality of switches comprises a momentary detent switch mounted on said circuit board for allowing momentary user-selection of MANUAL mode.

28. The fishing reel according to claim 27, further comprising a plurality of LED indicators switches mounted on said circuit board for providing a visual indication of ON/OFF and the user-selected AUTOMATIC and MANUAL modes.

29. In a fishing reel having a crank, and spool and a spindle, an automatic free spool system comprising: a transducer for sensing rotation of said spool; a free spool controller including an electronic braking mechanism, and a circuit board having a processor for measuring rotation of said spool at said transducer, for releasing said braking mechanism to free spool upon detection of a first predetermined measure of spool rotation, and for reengaging said braking mechanism to drag upon detection of a second predetermined measure of spool rotation.

* * * * *